(12) United States Patent
Dailey, Jr. et al.

(10) Patent No.: US 6,344,911 B1
(45) Date of Patent: Feb. 5, 2002

(54) UPGRADABLE OPTICAL COMMUNICATION SYSTEM MODULE

(75) Inventors: Michael J. Dailey, Jr., Painted Post; James J. Watkins, Corning; Mark F. Krol, Painted Post, all of NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/474,887

(22) Filed: Dec. 29, 1999

(51) Int. Cl.[7] .......................... H04J 14/02; H04B 10/00
(52) U.S. Cl. ...................................... 359/127; 359/163
(58) Field of Search .................................. 359/127, 130, 359/152, 153, 163; 385/135

(56) References Cited

U.S. PATENT DOCUMENTS

| | | | | | |
|---|---|---|---|---|---|
| 5,757,998 | A | * | 5/1998 | Thatcher et al. | 385/75 |
| 5,767,999 | A | * | 6/1998 | Kayner | 359/163 |
| 5,879,173 | A | * | 3/1999 | Poplawski et al. | 438/138 |
| 5,915,061 | A | * | 6/1999 | Vanoli | 385/135 |
| 6,058,235 | A | * | 5/2000 | Hiramatsu et al. | 385/135 |
| 6,208,797 | B1 | * | 3/2001 | Vanderhoof et al. | 385/135 |

* cited by examiner

*Primary Examiner*—Leslie Pascal
*Assistant Examiner*—Dalzid Singh
(74) *Attorney, Agent, or Firm*—Eric M. Smith

(57) ABSTRACT

An component upgradable optical communications routing system using a base module and detachable opto-electronic modules for use in processing and directing optical signals in an optical communications system.

15 Claims, 5 Drawing Sheets

UPGRADABLE OPTICAL COMMUNICATION SYSTEM MODULE

BACKGROUND OF THE INVENTION

1. Field of the Invention

The present invention relates to optical communication systems, and more particularly to reconfigurable optical network elements.

2. Technical Background

Optical communications systems work by the transmission of light through optical waveguides. Due to the optical properties of the optical waveguides currently in use, only certain portions of the light spectrum are suitable for the transmission of optical signals. Each of these portions of the light spectrum encompasses light from one wavelength to another wavelength, thus defining a waveband. For example the three wavebands of most interest in optical communication systems are the wavebands from 800 nm to 870 nm, 1280 nm to 1330 nm and 1520 nm to 1620 nm. Each of these wavebands may be further divided into multiple sub-wavebands, where each of the sub-wavebands is defined as a region of the light spectrum centered on a center wavelength.

To increase the capacity of optical communications systems, multiple signals are simultaneously transmitted through optical waveguides utilizing the sub-wavebands. Wavelength add/drop multiplexers are an essential element in allowing a single optical waveguide to transmit more than one sub-waveband, and hence more than one optical signal at a time. Wavelength add/drop multiplexers (WADMs) are therefore important elements in optical network applications.

Wavelength add/drop multiplexers either separate a sub-waveband of light from an optical signal or add a sub-waveband of light to an optical signal, or do both. The use of wavelength add/drop multiplexers therefore allows the assembly of a number of discrete signals into a multiplexed optical signal that can travel through a single waveguide to other wavelength add/drop multiplexers where the multiplexed optical signal may be disassembled into its component signals. Each of the component signals may then be introduced into separate waveguides for delivery to different destinations. Wavelength add/drop multiplexers therefore may serve as a basic router in optical communication systems.

Fixed wavelength add/drop multiplexers that manipulate wavelengths do not typically have moving parts to wear out. The absence of moving parts means that fixed wavelength add/drop multiplexers are inherently more reliable than signal routing schemes that rely on switches to deliver optical signals to their proper destinations. One difficulty in using wavelength add/drop multiplexers as routers for optical communication systems has been that they have not been readily reconfigurable. Optical communication system architectures commonly in use do not allow for changing destinations of component signals without the interruption of the multiplexed signal.

The emergence of optical fiber communication systems from "long haul" systems into regional and local communication systems means that this lack of flexibility in signal routing without signal interruption must be overcome. This is necessary in order to allow systems to grow to meet customer needs. In particular, emerging metropolitan area network applications will require optical technologies that have low initial installation costs yet allow for optimized growth of the network and deployment of equipment.

To meet these demands, optical systems, components, and the capabilities of network elements ideally should be upgradable. There are a number of important considerations for implementing upgradable technologies. First the technologies ideally should be cost effective. The upgrade should use existing equipment that is in place; in other words, the upgrade should consist of replacing only those components necessary to upgrade capability, not the installation of an entire new suite of components. And most importantly, the upgrades should not interrupt service on wavelength channels that are not serviced by the equipment being upgraded. This last requirement is becoming increasingly important as networks transition from being voice transmission dominated to data transmission dominated. Temporary interruption of data transmission can compromise an entire transmission by introducing errors or requiring the retransmission of the entire message.

SUMMARY OF THE INVENTION

To meet the growing demand for upgradable add/drop technologies that meet the above requirements, a unique detachable opto-electronic module system with a simple serial add/drop architecture that allows for in-service upgrades is presented. One application is for upgrading the add/drop capability of a wavelength from fixed, to flexible, to reconfigurable all while maintaining service on unaffected channels. Another application is an upgradable optically protected add/drop card. The card allows service and system providers to customize the deployment of optical layer protection on a wavelength-by-wavelength basis and two change the protection configuration of a wavelength while maintaining service on un-effected channels.

One aspect of the present invention relates to an optical communications device having an optical circuit configured to receive, transmit and manipulate a number of wavebands, and an opto-electronic module, detachably engageable in optical communication with said optical circuit.

In another aspect, the invention may include an optical communication system having an optical circuit configured to receive, transmit and manipulate a number of wavebands. In this aspect, the optical circuit includes a system input port configured to receive the number of wavebands, and an optical processor that separates a waveband from the number of wavebands. The circuit may further include a system output port configured to transmit the number of wavebands from the optical circuit to an optical device docking input port, configured to receive an optical signal from an opto-electronic module, and a docking output port configured to transmit the separated wave band from the optical circuit to the detachable opto-electronic module.

In another aspect, the invention includes an optical communications device having an optical circuit configured to receive, transmit and manipulate a number of wavebands, and an opto-electronic module, detachably engageable in optical communication with the optical circuit. The detachable opto-electronic module includes, an internal input port for receiving the separated waveband from the optical circuit, and a waveguide connecting the internal input port to an internal output port. The output port is configured to transmit the separated waveband from the detachable opto-electronic module back to the optical circuit.

Another aspect of the invention relates to an optical communications device having an optical circuit configured to receive, transmit and manipulate a number of wavebands, and a detachable opto-electronic module engageable in optical communication with the optical circuit. The optical circuit has a system input port, a filter, where the filter separates a waveband from the number of wavebands, a system output port, configured to transmit the number of wavebands from said optical circuit to an optical device, a docking input port, configured to receive an optical signal from the detachable opto-electronic module and a docking output port. The docking output port is configured to transmit the separated waveband from the optical circuit to the detachable optoelectronic module. The detachable opto-electronic module has an internal input port, for receiving the separated waveband from the optical circuit. An external output port transmits the separated sub-waveband from the detachable opto-electronic module to an optical waveguide. An external input port receives an optical signal from a second optical waveguide. An internal output port is configured to transmit the optical signal received from the external input port from the detachable opto-electronic module to the optical circuit.

Another aspect of the invention relates to an optical communication device having an optical circuit configured to receive, transmit and manipulate multiple wavebands. Where the optical circuit has a system input port configured to receive a plurality of wavebands. A filter separates a waveband from the multiple wavebands received. A system output port is configured to transmit the multiple wavebands from the optical circuit to an optical device. A docking input port is configured to receive an optical signal from the detachable opto-electronic module, and a docking output port configured to transmit the separated waveband from the optical circuit to the detachable opto-electronic module. A detachable opto-electronic module, engageable in optical communication with the optical circuit has an external input port, for receiving an optical signal from an optical waveguide. It also has an internal input port, for receiving the separated waveband from the optical circuit, and an internal output port, for optical communication with the optical circuit. A switch directs the separated waveband to either the external output port or the internal output port, where the external output port is for transmitting the separated waveband from the detachable opto-electronic module to an optical device.

Another aspect of the invention relates to an optical communications system having an optical circuit configured to transmit, receive and manipulate a plurality of wavebands. The optical circuit has a system input port configured to receive multiple wavebands and a fiber Bragg grating that separates a waveband from multiple wavebands received. A system output port is configured to transmit the wavebands from the optical circuit to an optical device. The optical circuit also includes a docking input port and a docking output port configured for optical communication with a detachable opto-electronic module.

Another aspect of the invention relates to an optical communications system having an optical circuit configured to transmit, receive and manipulate a plurality of wavebands and a detachable opto-electronic module engageable in optical communication with the optical circuit. The optical circuit has a system input port configured to receive multiple wavebands, a thin film filter for separating a waveband from the multiple wavebands received, and a system output port that transmits the wavebands from the optical circuit to an optical device. It also includes a docking input port for receiving an optical signal from a detachable opto-electronic module, and a docking output port that transmits the separated waveband from the optical circuit to the detachable opto-electronic module.

Another aspect of the invention relates to an optical device for use with an optical communication system. In this embodiment of the present invention, the optical device has an internal input port for receiving optical signals, an internal output port for transmitting optical signals from the optical device to the optical circuit, an external input port for receiving optical signals and an external output port for transmitting the optical signals received from the optical circuit, from the optical device to another optical device.

Another aspect of the invention relates to an optical device for use with an optical communication system. In this embodiment of the present invention, the optical device has an internal input port and an internal output port. The internal input port is configured to receive an optical signal from an optical circuit. The internal input port is one end of an optical path and the internal output port is the other end of the optical path. The optical signal received by the internal input port travels the optical path to the internal output port. The internal output port is configured to introduce the optical signal into the optical circuit.

Another aspect of an embodiment of the present invention relates to an optical device for use with an optical communication system. In this embodiment the optical device includes an internal input port, configured for removable engagement with an optical circuit and capable of communication with the optical circuit. An internal output port, configured for removable engagement with an optical circuit and capable of communication with the optical circuit. An external input port, configured to receive optical signals. An external output port for introducing optical signals into an optical waveguide. A switch for directing the optical signal received from the optical circuit to either the internal output port or the external output port.

The optical communication system of the present invention results in a number of advantages over the prior art. For example, an embodiment of the present invention allows multiple wavebands to be added or dropped from an optical communications systems, without interrupting the transmission of the wavebands not being dropped or added.

Another advantage of an embodiment of the present invention results in the allowance of maintenance of carrying a particular waveband without interrupting other wavebands optical paths being transmitted through the communications node.

Another advantage of an embodiment of the present invention allows the rapid reconfiguration of a system on a channel-by-channel basis, without interrupting the flow of communications carried on separate channels or wavebands, of the optical communications system.

Another advantage of an embodiment of the present invention is the ability to design modular systems using numerous motherboards and detachable opto-electronic modules in diverse combinations to direct large numbers of optical signals contained in separate wavebands coming down single fiber optic cables.

Another advantage of an embodiment of the present invention is the ability of the detachable opto-electronic modules to be configured to provide separate and distinct functions. These functions include reintroducing the signal into the main carrier optical fiber, or taking the separated waveband and directing it towards a remote unit. The detachable opto-electronic module may also incorporate a switch that allows a separated waveband to be directed to a remote unit via the detachable opto-electronic module or to be reintroduced into the optical signal carrying the remainder of the wavebands to another optical device.

Another advantage of the optical communications system of the present invention results in an optical communications device that is capable of directing any number of wavebands capable of being carried on an optical fiber. Each waveband comprising a channel of some form of telecommunications data may be directed to any number of sources without the need for switches. The system is reconfigurable to redirect any of the channels to any other desired location by simply changing the detachable opto-electronic modules, thereby improving the reliability and integrity of the system.

Yet another advantage of an embodiment of the present invention is the economical benefits that are conferred by having an optical communications node capable of having its switching and signal directing capabilities selectively upgradable, without having to invest resources in the redirectable equipment of the node at the time of installation.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention and are incorporated in and constitute a part of this specification. The drawings illustrate one or more embodiments of the invention, and together with the description serve to explain the principals and operation of the invention.

DETAILED DESCRIPTION OF THE DRAWINGS

Figure 1:
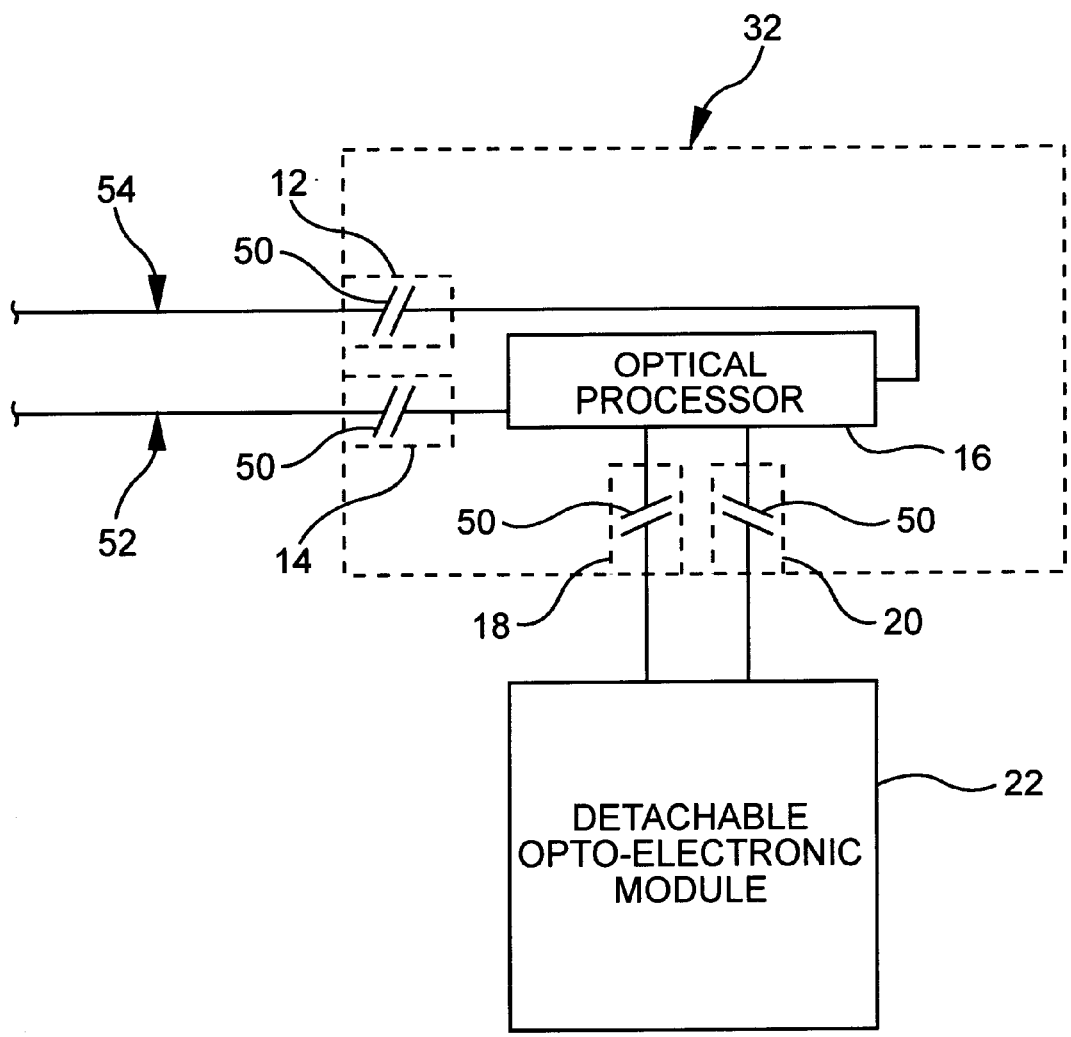
FIG. 1 is a schematic of an optical circuit in which the present invention is embodied.
Figure 2:
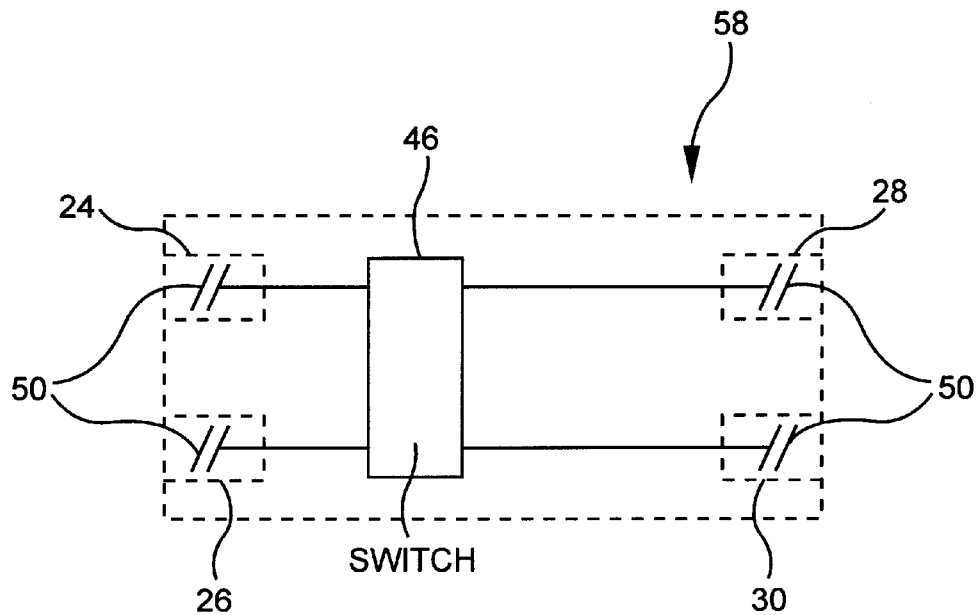
FIG. 2 is a schematic of the optical circuitry of an embodiment of a detachable opto-electronic module of an embodiment of the present invention.
Figure 3:
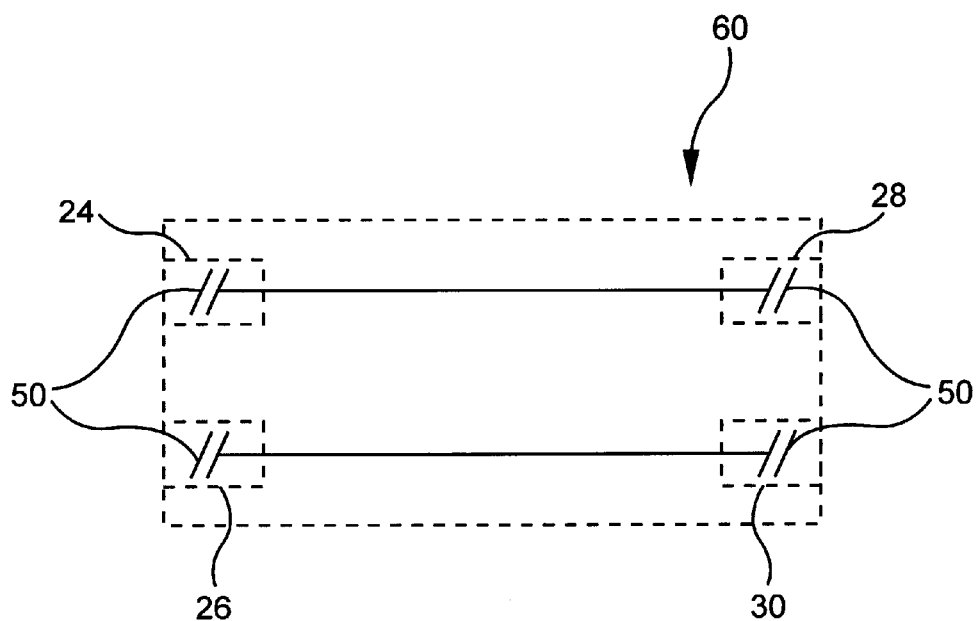
FIG. 3 is a schematic of the optical circuitry of an alternative embodiment of a detachable opto-electronic module of an embodiment of the present invention.

Reference will now be made in detail to the present preferred embodiment of the invention, examples of which are illustrated in the accompanying drawings. Whenever possible, the same reference numbers will be used throughout the drawings to refer to the same or like parts. An exemplary embodiment of the optical communication system of the present invention as shown in FIG. 1 is designated generally throughout by reference 10.

In accordance with the invention, the present invention for an optical communications system includes a base module 32. As embodied herein, and depicted in FIGS. 1 through 7, the base module 32 includes an optical circuit 11 having a system input port 12, a system output port 14, an optical processor 16, a docking input port 18, a docking output port 20, a detachable opto-electronic module 22 an internal input port 24 and internal output port 26, an external output port 28, an external input port 30.

The system input port 12 is configured to receive an optical signal spanning a waveband, exemplary of which are the wavebands from 800 nm to 870 nm, 1280 nm to 1330 nm and 1520 nm to 1620 nm. The optical signal may be made up of discrete signals contained in sub-wavebands. For example an optical system may be configured to transmit optical signals with wavelengths between 1520 nm and 1620 nm. The entire waveband is not required to transmit a single data stream. Because only a portion of the waveband is required for a single data stream, multiple data streams, each utilizing a separate portion of the waveband, e.g. 800 nm to 810 nm and 850 nm to 860 nm, may be transmitted simultaneously. The system input port 12 is secured to the base module 32 and serves as the point at which an optical signal may be introduced into the optical circuit 11 of the base module 32. The system input port 12 may be connected to an optical waveguide 52 or to another base module 32.

The optical signal, which is introduced through the system input port 12 travels down an optical path to an optical processor 16. The optical processor 16 may be a multiplexer/demultiplexer, exemplary of which is a four port filter or an equivalent optical circuit comprised of optical components, a switch fabric or any other optical device that processes optical signals. Typical optical components that may be used in constructing an optical circuit for multiplexing/demultiplexing include Bragg gratings, Mach-Zehnder devices, and thin film filter devices. The optical processor 16 is configured for wavelength division (also referred to as wavelength drop) of the optical signal. Wavelength drop occurs when a selected sub-waveband of the signal is separated from the remainder of the signal. The sub-waveband that is dropped travels along an optical path to a docking output port 20. The docking output port 20 is connected to an internal input port 24 which is part of a detachable opto-electronic module 22.

The remainder of the optical signal exits the optical processor 16 and is directed to the system output port 14. The optical processor 16, typically a four port filter or an equivalent optical circuit, allows the addition of optical signals from the detachable opto-electronic module 22 to be added to the optical signal transmitted from the base module 32 to other parts of the optical communication system through the system output port 14.

The docking input port 18 and the docking output port 20 of the base module 32 and the internal input port 24 and the internal output port 26 of the detachable opto-electronic module 22 are preferably plug-in type connectors. Exemplary of plug-in type optical connectors are optical backplane connectors manufactured by Molex Corporation under the trade name BIC and more generally known as backplane SC connectors. The internal output port 26 of the detachable opto-electronic module 22 and the docking input port 18 of the base module 32 are configured to allow an optical signal of a certain waveband to be transmitted from the detachable opto-electronic module 22 to the base module 32. The optical signal travels along an optical path to the optical processor 16 where it is multiplexed into the portion of the optical signal received into the optical circuit 11 of the base module 32 through the system input port 12 not directed to the detachable opto-electronic module 22. This multiplexed signal, made up of a number of sub-wavebands, is directed to the system output port 14.

The base module 32 includes an electrical plug-in connector 40 for connection to an electrical plug-in connector 38 mounted on the detachable opto-electronic module 22. This electrical connection allows a controller for the optical communication system (not shown) to determine the type of detachable opto-electronic module 22 currently engaged with the base module 32. Exemplary of the types of detachable opto-electronic modules 22 that may be removably engaged with the optical circuit 11 are reconfigurable cards 58, flexible cards 60, and fixed cards 62.

Figure 4:
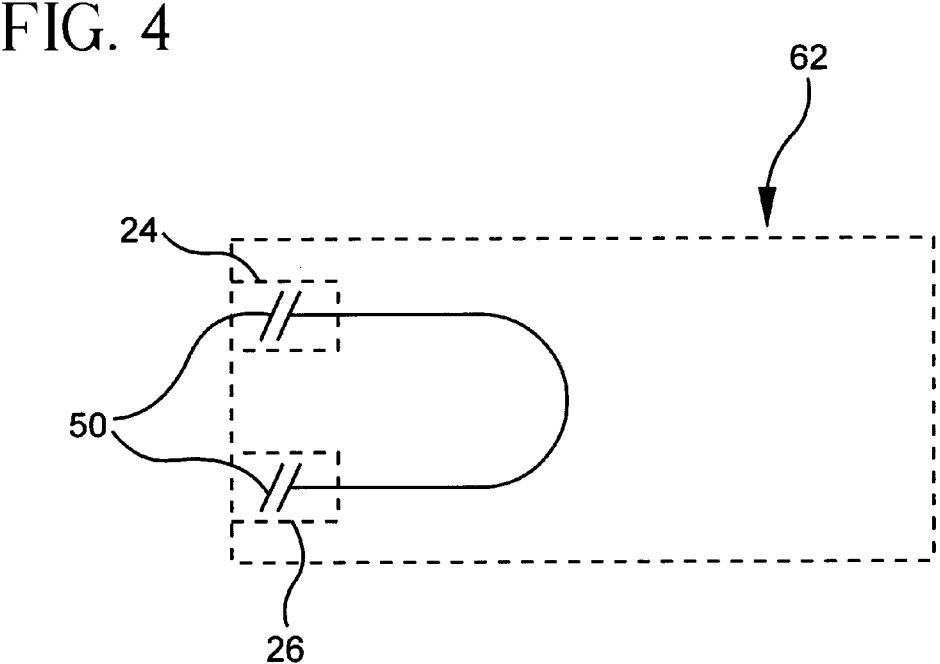
FIG. 4 is a schematic of the optical circuitry of another alternative embodiment of a detachable opto-electronic module of an embodiment of the present invention.

Another alternative embodiment of the invention, as embodied herein is a detachable opto-electronic module 22, known as a reconfigurable card 58, having an internal input port 24, an internal output port 26, an external output port 28, an external input port 30, and a switch 46. FIG. 4 shows one possible schematic for an optical circuit of this embodiment. The detachable opto-electronic module 22 in this configuration allows for great deal of flexibility. Exemplary of this flexibility is when the switch 46 is a 2×2 optical switch the switch is capable of not only directing the separated waveband to either the internal output port 26, or the external output port 28 but also directing an optical signal from the external input port 30 to the internal output port 26.

Therefore, if switch 46 is a 2×2 optical switch, the detachable opto-electronic module 22 may be configured two ways. The detachable opto-electronic module may be configure to simultaneously transmit optical signals from the internal input port 24 to the external output port 28 and to transmit optical signals from the external input port 30 to the internal output port 26. Alternatively the detachable opto-electronic module 22 can be configured to transmit an optical signal from the internal input port 24 to the internal output port 26.

In this way a signal can be either sent to a destination separate from the destination for the remainder of the input signal or directed back into the optical circuit 11 for integration into the optical signal originally received through the system input port 12 of the base module 32.

Another embodiment of the detachable opto-electronic module 22 is a flexible card 60. In this embodiment the internal input port 24 is optically connected to the external output port 28 and the external input port 30 is optically connected to the internal output port 26. In this configuration an optical signal introduced into the internal input port 24 is directed to the external output port 28 and a signal introduced into the external input port 30 is directed to the internal output port 26.

Another embodiment of the detachable opto-electronic module 22 is a fixed card 62, exemplary of which is a plug-in type card, in which the internal input port 24 of the detachable opto-electronic module 22 is connected to an internal output port 26.

The overall design of a communications node for optical communications using embodiments of the present invention have a number of base modules 32 configured to receive an optical signal through a system input port 12.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

In an alternative embodiment of the present invention the optical communications system 10 includes a base module 32 and a number of detachable opto-electronic modules 22.

The base module 32 includes a system input port 14. The system input port 14 is configured to allow the introduction of an optical signal into the base module 32. Exemplary of devices that may serve as system input ports are optical connectors such as FC connectors, SC connectors, BSC connectors, SMA connectors and ST® connectors distributed by Molex Incorporated of Lisle, Ill.

The system input port 14 is connected to an optical circuit 11. The optical circuit includes an optical processor 16 that in one embodiment is a switch fabric. Optical circuitry connects at least some of the ports of the switch fabric to a docking input port 18 and a docking output port 20.

The docking input port 18 and the docking output port 20 are optical connectors configured for engagement with a detachable opto-electronic module 22. Exemplary of optical connectors that may be used in the docking input port 18 and the docking output port 20 are optical backplane connectors. The docking input port 18 and the docking output port 20 allow the base module to engage in optical communication with a detachable opto-electronic module 22.

The detachable opto-electronic module 22 contains optical circuitry. The optical circuitry may include both active and passive optical components and switches. Exemplary of the optical circuitry are the fixed, flexible and reconfigurable detachable opto-electronic modules described above. Additionally, the optical circuitry of the detachable opto-electronic module 22 may include switch fabrics, wavelength drop/add circuitry or components, signal conditioning components, such as dispersion compensation circuitry, and optical path protection circuitry for maintaining the integrity of the optical communication system that the base module 32 and the detachable opto-electronic module 22 are a part of.

Figure 5:
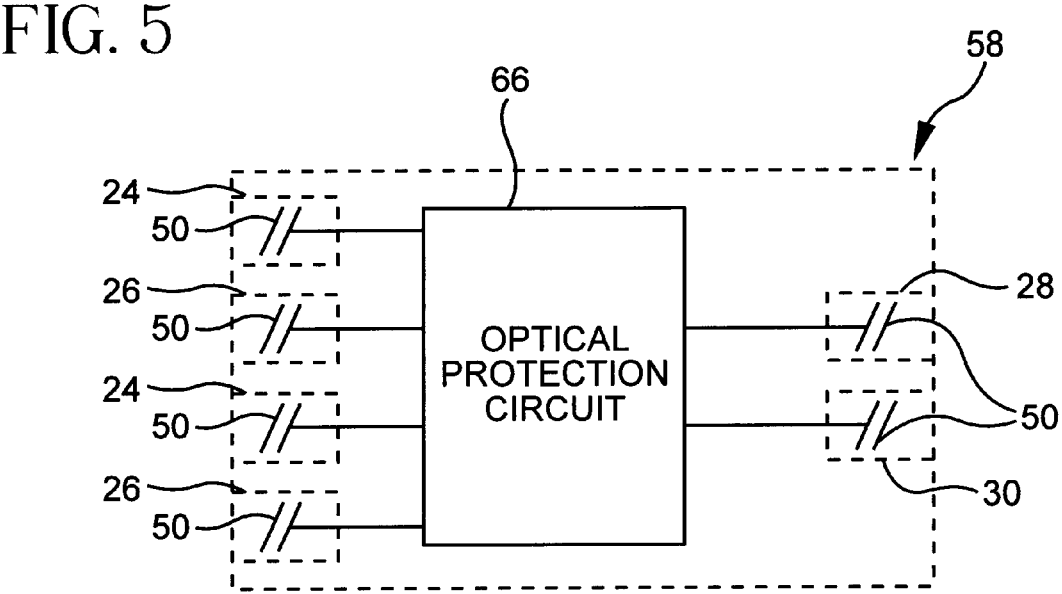
FIG. 5 is a schematic of the optical circuitry of another alternative embodiment of a detachable opto-electronic module of an embodiment of the present invention.
Figure 6:
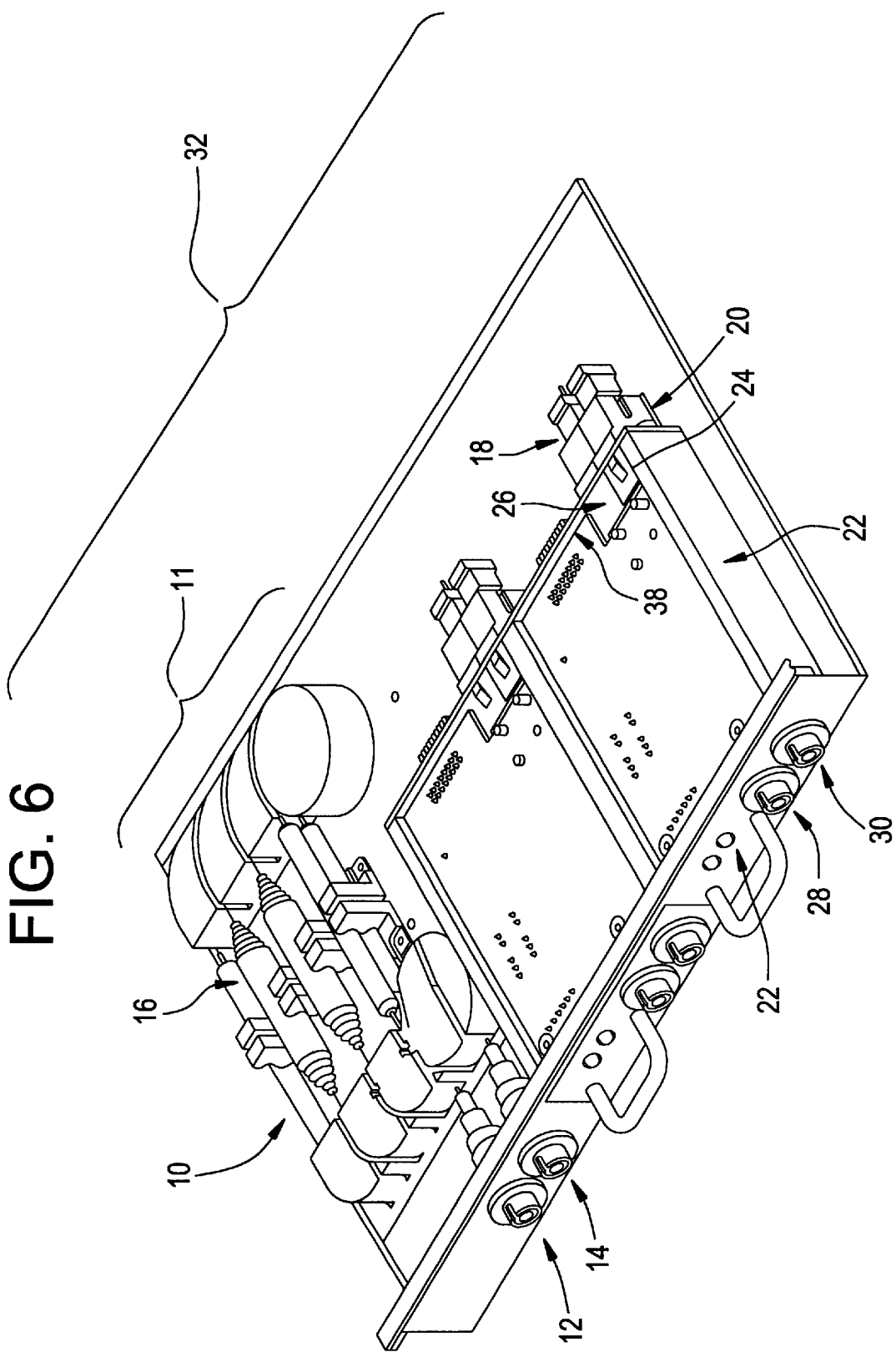
FIG. 6 is a perspective view of an optical device in which the present invention is embodied.
Figure 7:
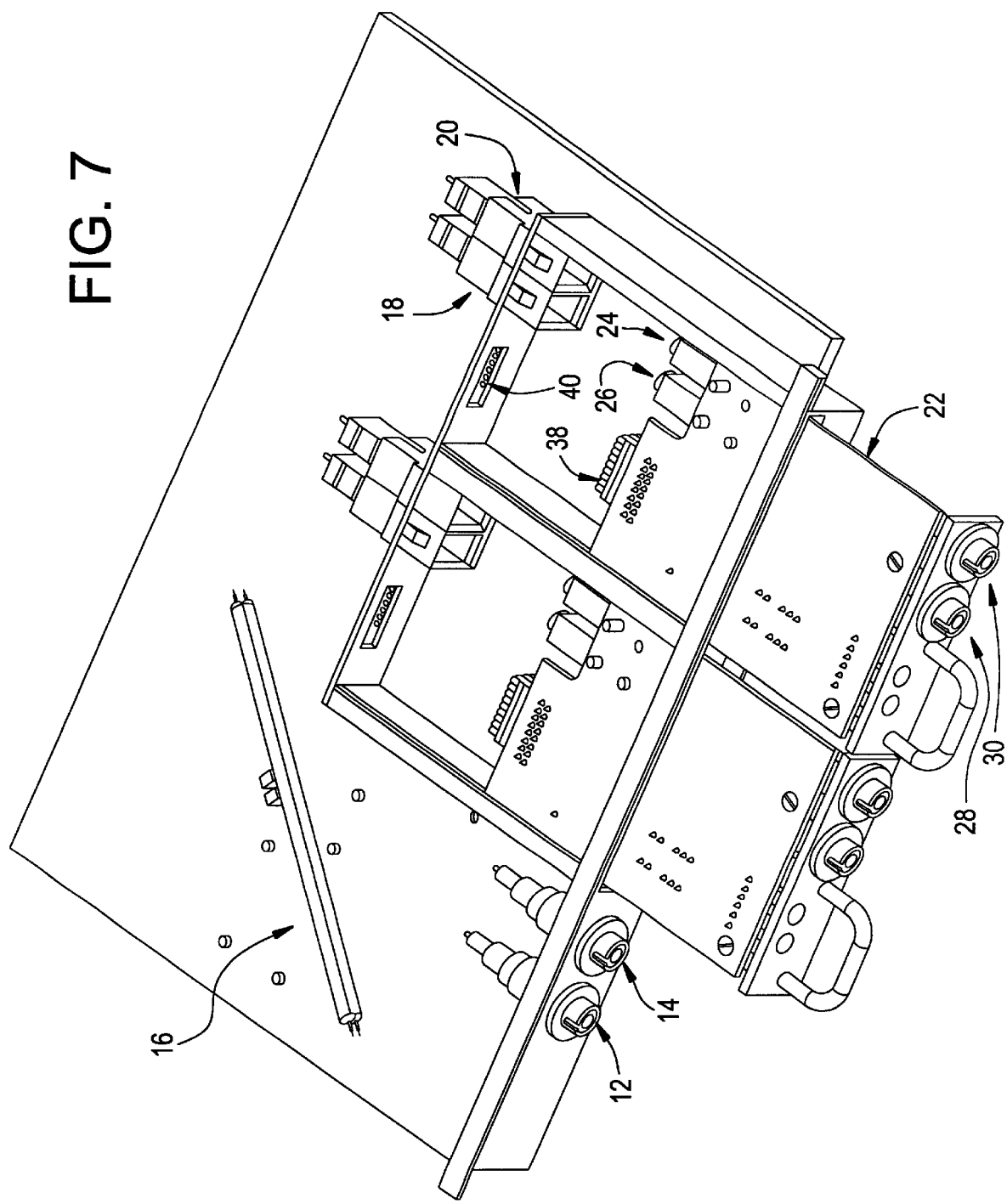
FIG. 7 is a perspective view of an optical device in which the present invention is embodied.

FIG. 5 is a schematic of the optical circuitry of a detachable opto-electronic module 22 configured for use in optical protection. The detachable opto-electronic module 22 includes two internal input ports 24 that engage two docking output ports 20 on a base module 32 and two internal output ports 26 that engage two docking input ports 18. Each of these ports includes an optical connector 50 that allows the detachable opto-electronic module 22 to engage in optical communication with the base module 32. The internal input ports 24 and the internal output ports 26 are connected to an optical protection circuit 66. The detachable opto-electronic module 22 also includes an external input port 30 and an external output port 28, each of which includes an optical connector 50. The external input port 30 and the external output port 28 are connected to the optical protection circuit 66. The external input port 30 and the external output port 28 allow the base module 32 to engage in optical communication with the remainder of the optical communication system that the base module 32 and the detachable opto-electronic module 22 are part of The base module 32 also includes an electrical plug-in connector 38 configured for engagement with an electrical plug-in connector 40 of a detachable opto-electronic module 22. The electrical plug-in connector 38 allows the base module 32 to engage in electronic communication with the detachable opto-electronic module 22. This electrical communication may take the form of allowing the base module 32 to determine the type of detachable opto-electronic module 22 that is engaged with the base module 32. The electronic communication may also take the form of control inputs to a switch fabric on the detachable opto-electronic module 22 or the providing of electrical power to active opto-electronic components mounted on the detachable opto-electronic module 22.

What is claimed is:

1. An optical communication device comprising:
    a base module, said base module including an optical circuit configured to receive, transmit and manipulate a plurality of wavebands; and
    a detachable opto-electronic module, engageable in optical communication with said optical circuit
    wherein said optical circuit further comprises:
        a system input port, configured to receive said plurality of wavebands;
        an optical device, wherein said optical device separates a waveband from said plurality of wavebands;
        a system output port, configured to transmit said plurality of wavebands from said optical circuit to an optical device;
        a docking input port, configured to receive an optical signal from said detachable opto-electronic module; and
        a docking output port, configured to transmit said separated waveband from said optical circuit to said detachable opto-electronic module.

2. The optical communication device of claim 1, wherein said detachable opto-electronic module further comprises:
    an internal input port, for receiving said separated waveband from said optical circuit;
    an internal output port, configured to transmit said separated waveband from said detachable opto-electronic module to said optical circuit; and
    a waveguide connecting said internal input port to said internal output port.

3. The optical communication device of claim 1, wherein said detachable opto-electronic module further comprises:
    an internal input port, for receiving said separated waveband from said optical circuit;
    an external output port, for transmitting said separated waveband from said detachable opto-electronic module to a first optical waveguide,
    an external input port, for receiving an optical signal from a second optical waveguide; and
    an internal output port, configured to transmit said optical signal from said detachable opto-electronic module to said optical circuit.

4. The optical communication device of claim 1, wherein said detachable opto-electronic module further comprises:
    an external input port, for receiving an optical signal from a first optical waveguide;
    an external output port, wherein said external output port is for transmitting said separated waveband from said detachable opto-electronic module to a second optical waveguide;
    an internal input port, for receiving said separated waveband from said optical circuit;
    an internal output port for optical communication with said optical circuit; and
    a switch, capable of directing said separated waveband to said external output port or said internal output port and directing said optical signal to said internal output port or said external output port.

5. An optical communication system comprising:
    a optical circuit configured to receive, transmit and manipulate a plurality of wavebands, and
    a detachable opto-electronic module, engageable in optical communication with said optical circuit,
    wherein said optical circuit includes;
        a system input port, configured to receive said plurality of wavebands;
        an optical device, wherein said optical device separates a waveband from said plurality of wavebands;
        a system output port, configured to transmit said plurality of wavebands from said optical circuit to an optical device;
        an internal input port, configured to receive an optical signal from said detachable opto-electronic module;
        an internal output port, configured to transmit said separated waveband form said optical circuit to said detachable opto-electronic module.

6. The optical communication system of claim 5, wherein said detachable opto-electronic module further comprises:
    an internal input port, for receiving said separated waveband from said optical circuit;
    an internal output port, configured to transmit said separated waveband from said detachable opto-electronic module to said optical circuit; and
    a waveguide connecting said internal input port to said internal output port.

7. The optical communication system of claim 5, wherein said detachable opto-electronic module further comprises:
    an internal input port, for receiving said separated waveband from said optical circuit;
    an external output port, for transmitting said separated waveband from said detachable opto-electronic module to a first optical waveguide,
    an external input port, for receiving an optical signal from a second optical waveguide; and
    an internal output port, configured to transmit said optical signal from said detachable opto-electronic module to said optical circuit.

8. The optical communication system of claim 5, wherein said detachable opto-electronic module further comprises:
    an external input port, for receiving an optical signal from a first optical waveguide;
    an external output port, wherein said external output port is for transmitting said separated waveband from said detachable opto-electronic module to a second optical waveguide;
    an internal input port, for receiving said separated waveband from said optical circuit;
    an internal output port for optical communication with said optical circuit; and
    a switch, capable of directing said separated waveband to said external output port or said internal output port and directing said optical signal to said internal output port or said external output port.

9. The optical communication system of claim 5, wherein said optical device utilizes Bragg gratings.

10. The optical communication system of claim 5, wherein said optical device utilizes thin film filters.

11. The optical communications system of claim 5, wherein said optical device utilizes Mach-Zehnder devices.

12. An optical communication device comprising:
    a first surface;
    a second surface, configured for removable engagement with said first surface;
    a system input port, mounted to said first surface and configured to receive a plurality of wavebands, wherein said system input port is the proximate terminus of an optical path;
    a system output port, configured to transmit an optical signal, wherein said system output port is the distal terminus of said optical path;

a optical filtering device, mounted to said first surface and disposed along said optical path between said proximate terminus and said distal terminus, wherein said optical filtering device separates a waveband from said plurality of wavebands;

a first half plug-in optical connector for removable engagement with a second half plug-in optical connector, said first half plug-in connector being secured to said first surface and connected to said filter, said second half plug-in connector being secured to said second surface; and a third half plug-in optical connector for removable engagement with a fourth half plug-in optical connector, said third half plug-in connector being secured to said first surface and connected to said system output port, said fourth half plug-in connector being secured to said second surface.

13. The optical communication device of claim 12 further comprising:

an optical waveguide connected to said second half plug-in optical connector and said fourth half plug-in optical connector, said waveguide disposed to transmit an optical signal from said second half plug-in optical connector to said fourth half plug-in optical connector.

14. The optical communication device of claim 12 further comprising:

an input port, mounted to said second surface and disposed to receive an optical signal;

an output port, mounted to said second surface and configured for optical communication with an optical device;

a first optical waveguide connected to said second half plug-in optical connector and connected to said output port; and a second optical waveguide connected to said fourth half plug-in connector and said input port.

15. The optical communication device of claim 12 further comprising:

input port, connected to said second surface and disposed to receive an optical signal, an output port, said output port secured to said second surface and configured for optical communication with an optical device;

a switch, disposed to direct said separated waveband to a either said fourth half or to said output port; and a second optical waveguide connected to said fourth half plug-in connector and connected to said input port.

* * * * *